United States Patent Office 3,755,501
Patented Aug. 28, 1973

3,755,501
PHOSPHATE OR PHOSPHITE ESTERS OF S-(2-HYDROXYALKYL)PHOSPHORODITHIOATES
Milton Braid, Westmont, N.J., assignor to
Mobil Oil Corporation
No Drawing. Original application June 3, 1968, Ser. No. 733,815, now Patent No. 3,544,465. Divided and this application June 25, 1970, Ser. No. 49,983
Int. Cl. C07f 9/18; C10m 1/48
U.S. Cl. 260—928                      8 Claims

ABSTRACT OF THE DISCLOSURE

Novel esters of O,O-diorgano - S - (2 - hydroxyalkyl)phosphorodithioates are excellent antioxidants and corrosion inhibitors in industrial fluid compositions. This application is specifically concerned with ester prepared from the phosphorodithioate and a phosphorus-containing compound.

CROSS-REFERENCE TO RELATED APPLICATIONS

This application is a division of U.S. application Ser. No. 733,815, filed June 3, 1968, now U.S. Pat. 3,544,465.

BACKGROUND OF THE INVENTION

Field of the invention

This invention relates to esters of phosphorodithioates and, in particular, it relates to esters of diorganophosphorodithioate-alkylene oxide reaction products.

Description of the prior art

U.S. Pat. No. 3,197,405 and 3,197,496 describe reactions between triesters of phosphorothioic acids and inorganic phosphorus compounds. The products of these reactions are not entirely satisfactory as additives in industrial fluids.

SUMMARY OF THE INVENTION

Novel esters of organic phosphorodithioates are prepared by reacting a diorganophosphorodithioic acid with an olefin oxide and reacting the intermediate product of this reaction with a compound of organophosphorus, said compound being capable of forming a stable oxygen-ester bond with the said intermediate. The compound contains at least one reactive chemical group or atom, such as an acyl, acyloxy or hydroxyl group or a halogen atom.

DESCRIPTION OF SPECIFIC EMBODIMENTS

The products of this invention have the following structure:

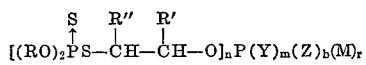

wherein R, R' and R" may each be a hydrocarbyl radical, including alkyl, aralkyl, aryl or alkaryl, and substituted derivatives thereof, containing from 1 to about 30 carbon atoms, and R' and R" may also be hydrogen or members of a cyclic hydrocarbon ring or heterocyclic ring containing atoms of oxygen, nitrogen or sulfur therein, or of a polymeric chain having over 30 carbon atoms; Y, Z, and M may each be oxygen, sulfur, acyl, alkyl, aralkyl, aryl or alkaryl, alkoxy, aralkoxy, aryloxy and alkaryloxy, and when each contains an organic radical, said radical may contain from 1 to about 30 carbon atoms; n is an integer of from 1 to 3; and the total of m, b, and r may range from 0 to (v—n), v being the valence of P. Preferably, at least one of m, b, or r is at least 1. In the above formula one or more of Y, Z, or M is an organic group.

The products of this invention are esters which are strikingly effective as anti-corrosion agents and antioxidants in industrial fluids, especially in lubricating oils. These esters are particularly effective in preventing corrosion of copper surfaces.

The intermediate product in this invention is prepared by a reaction between a diorganophosphorodithioic acid and an organo-1,2-oxide. The acid is produced by known means, usually by the reaction between an alcohol or a phenol or naphthol with phosphorus pentasulfide. This acid,

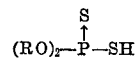

wherein R is defined above, is reacted with an organo-1,2-oxide in which the epoxide grouping is an internal or terminal group. One carbon atom becomes linked to a sulfur atom of the acid, and the hydroxyl group is in the 2-position relative to the sulfur atom as in the structure

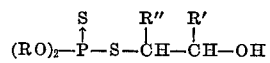

R' and R" being defined previously. This intermediate, which is also referred to as an O,O-diorgano-S-(2 - hydroxyalkyl)phosphorodithioate, is then reacted with the reactive acyl, hydroxyl or halogen compound in a condensation reaction to produce the final product.

The alcohols found suitable for reaction with the $P_2S_5$ for producing the phosphorodithioic acid contain preferably from 1 to 20 carbon atoms and may include the alcohols, ethyl alcohol, propyl alcohol, n-butyl alcohol, isobutyl and sec-butyl alcohols, the isomeric primary and secondary amyl alcohols, and mixtures thereof, the primary and secondary isomers of hexyl alcohol, cyclohexyl alcohol, the isomers of octyl alcohol, decyl alcohol, lauryl alcohol, benzyl alcohol, mixtures of these, and the like. Aromatic hydroxy compounds include phenol, cresol, xylenol, naphthol, ethylphenol, butylphenol, nonylphenol, mixtures of these and the like. Mixtures of alcohols and aromatic hydroxy compounds are also suitable. Halogenated derivatives, may also be employed.

The phosphorodithioic acids prepared from these alcohols and phenols are reacted with an organic oxide, which has the structure

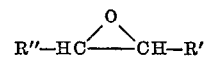

wherein R' and R" have the aforenoted definitions. Suitable oxides include ethylene oxide, propylene oxide, butylene oxide, cyclohexene oxide, styrene oxide and the like.

In another aspect of this invention, R' or R" or both may also contain additional epoxy groups, as in the cases of the diepoxides and polyolefin polyoxides. The resulting intermediate reaction product could contain two or more hydroxy groups and diorganophosphorodithio groups attached through the sulfur atom to the B-carbon atom relative to the hydroxide, as in the abbreviated structure shown:

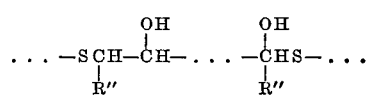

or

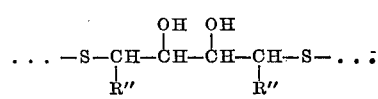

The final products could then have the structure:

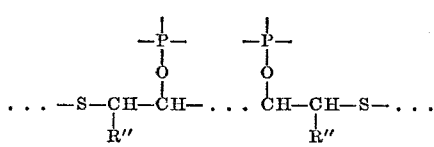

or

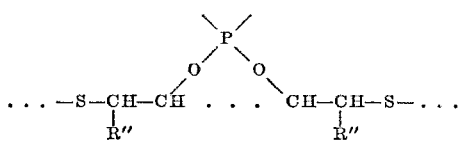

All such structures are included within the scope of this invention.

This reaction to produce the intermediate product is preferably performed in the presence of an inert organic solvent, such as benzene. The reaction mixture may be maintained at a preferred temperature range from about 0° to about 100° C. The reaction mixture may be thereafter refluxed to insure completion of the reaction. The solvent and any unreacted components are removed by distillation under reduced pressure. The reaction product may be refined further by filtering out any undesirable solids or distilling any unwanted side products.

The resulting intermediate is reacted with the active acyl, hydroxyl, or halogen compound, wherein the nonmetallic atom, P, is attached to from 1 to 3 hydroxyl or acyl groups or halogen atoms. Ester formation may take place by condensation with elimination of water, hydrogen halide or acid.

As has been stated in the above formula, at least one of Y, Z or M is organic or organo-oxy. Suitable reactants include phosphorus and thiophosphorus acid derivatives, such as mono- or di-organophosphates and phosphonates and their thiophosphorus analogs, pyrophosphates or anhydrides, halophosphites, halophosphates, phosphonyl halides, and their thiophosphorus analogs, and the like. The reactant may be formed in situ by adding a phosphorus or thiophosphorus halide or anhydride to the reaction mixture containing an alcohol or phenol.

Thus, Y, Z or M may be an organic or inorganic group or mixtures of the two, or members of one cyclic group, such as a cycloalkyl group or alkylenedioxy or arylenedioxy group. If one substituent attached to P is divalent, a multiple bond linkage may occur as in a carbonyl, sulfoxide or sulfone functional group. The organic radicals may contain from 1 to 30 carbon atoms, and preferably 1 to 20.

The products of this invention may be used in industrial fluids, such as lubricating oils and fuels. Suitable lubricating oils include naphthenic and paraffinic mineral oils; synthetic lubricating oils, such as esters of beta-hindered alcohols having 2 to 4 hydroxy groups, such as neopentyl glycol, trimethylolpropane and pentaerythritol, and monocarboxylic acids having from 1 to 25 carbon atoms; hydrocarbon fluids produced from alkanes and olefins, such as polymers of 5 to 15 carbon atoms, i.e., trimer and tetramer of decene; polyglycol ethers; polysiloxane fluids; and the like. These fluids may be further compounded by thickeners to produce grease compositions. Liquid and solid fuels capable of being compounded, such as hydrocarbon fuels, kerosene and gasoline, may also be employed. Plastics and resins, normally susceptible to oxidative attack may be the base media for these additives. All of such compositions are given excellent inhibition and antioxidant stability by the additives of this invention.

The following examples are presented as illustrations of the invention and are not deemed a limitation thereof.

EXAMPLE 1

To a solution of 100 grams (0.32 mole) of O,O-ditolylphosphorodithioate in 100 ml. of benzene, 25.2 grams (0.35 mole) of 1,2-butylene oxide is added over a 30-minute period while stirring and maintaining the reaction temperature at about 40° C. The resulting reaction mixture is then heated at 60° to 80° C. for 30 minutes, filtered and distilled at reduced pressure to remove solvent and unreacted butylene oxide. There remains 119.4 grams (97% yield) of the reaction product, O,O-ditolyl-S-(2-hydroxybutyl)phosphorodithioate.

*Analysis.*—Calc'd: P, 8.09%. Found: P, 8.14%.

EXAMPLE 2

To a solution of 80 grams (0.209 mole) of O,O-ditolyl-S-(2-hydroxybutyl)phosphorodithioate, 13.7 grams (0.105 mole) of isooctyl alcohol, and 60 grams (0.6 mole) of triethylamine in 300 ml. of benzene there is added over a period of about 30 minutes, 14.4 grams (0.105 mole) of phosphorus trichloride while stirring and maintaining the temperature at 25° to 40° C. After addition is completed the reaction mixture is heated for about 1.5 hours at 45° to 52° C. and then hydrolyzed. The organic layer is separated, dried and distilled under reduced pressure to remove solvent. There remains 94 grams of the isooctyl phosphite ester of the phosphorodithioate, a clear, slightly viscous liquid.

*Analysis.*—P. 7.61%.

EXAMPLE 3

As in Example 2, 14.4 grams (0.105 mole) of phosphorus trichloride is added over a 15-minute period to a solution of 80 grams (0.209 mole) of O,O-ditolyl-S-(2-hydroxybutyl)phosphorodithioate, 23.1 grams (0.105 mole) of nonylphenol, and 100 grams (1 mole) of triethylamine in 100 ml. of N,N-dimethylformamide. The reaction mixture is heated for one hour at 50° to 52° C. and then washed with water. The organic layer is dried and distilled. There remains 71.1 grams of the nonylphenylphosphite ester of the phosphorodithioate.

EXAMPLE 4

As in Example 2, a reaction is carried out with 14.4 grams (0.105 mole) of phosphorus trichloride, 7.8 grams (0.105 mole) of n-butyl alcohol, 100 grams (1 mole) of triethylamine and 80 grams (0.209 mole) of O,O-ditolyl-S-(2-hydroxybutyl)phosphorodithioate in 300 ml. of benzene. There is obtained from this reaction 73.1 grams of the n-butylphosphite ester of the phosphorodithioate.

EXAMPLE 5

As in Example 2, a reaction is carried out with 80 grams (0.209 mole) of O,O-ditolyl-S-(2-hydroxybutyl) phosphorodithioate, 30.9 grams (0.42 mole) of n-butyl alcohol, 100 g. of triethylamine and 86.0 grams (0.627 mole) of phosphorus trichloride. After the initial addition of the phosphorus trichloride (1 hour at 25° C.) and subsequent reaction period (about 5.5 hours at 50° C.), an additional 100 grams of triethylamine and 93.5 grams (1.26 mole) of n-butyl alcohol were added and the mixture was heated and stirred at 50° C. for 5 hours. The resulting reaction mixture was filtered. The filtrate is washed with water, dried and distilled to remove solvent, tributyl phosphite, and other volatile materials. There remains about 65 grams of the di-n-butylphosphite ester of the phosphorodithioate, a viscous liquid.

*Analysis.*—Calc'd: P, 11.1%. Found: P, 10.6%.

EXAMPLE 6

As in Example 2, a reaction is carried out with 80 grams (0.20 mole) of O,O-ditolyl-S-(2-hydroxybutyl) phosphorodithioate, 30.9 grams (0.42 mole) of t-butyl alcohol, 150 grams of triethylamine and 29.7 grams (0.209 mole) of phosphorus trichloride in 300 ml. of benzene. There is obtained from this reaction about 91 grams of the di-t-butylphosphite ester of the phosphorodithioate.

*Analysis.*—Calc'd: P, 11.1%. Found: P, 10.6%.

EXAMPLE 7

Following the procedure of Example 2, a solution of 86 grams (0.627 mole) of phosphorus trichloride in benzene is added slowly to a solution of 80 grams (0.209 mole) of O,O-ditolyl-S-(2-hydroxybutyl)phosphorodithioate, 54.6 grams (0.418 mole) of isooctyl alcohol and 150 grams (1.5 mole) of triethylamine in 300 ml. of benzene. After heating, work-up, and removal of solvent there remains 117 grams of the diisooctyl phosphite ester of the phosphorodithioate, a clear yellow, slightly viscous liquid.

*Analysis.*—P, 9.20%.

EXAMPLE 8

To a solution of 100 grams (0.272 mole) of O,O-ditolyl-S-(2-hydroxybutyl)phosphorodithioate in 100 ml. of benzene there is added over a 15-minute period while stirring at 60° to 78° C., 27 grams (0.130 mole) of O-butylthiophosphoryl dichloride. Heating and stirring at 80° to 83° C. is continued for about one additional hour. The reaction mixture is distilled under reduced pressure, less than 1 mm. to a pot temperature of 120° C. The O-butylthiophosphate ester of the O,O-ditolyl-S-(2-hydroxybutyl)phosphorodithioate remains as a clear yellow, moderately viscous liquid.

*Analysis.*—Calc'd: P, 10.7; S, 18.4. Found (percent): P, 10.6; S, 18.8.

Evaluation of products

The compounds produced in accordance with this invention were blended into a refined mineral oil lubricant and tested in an oxidation test. A sample of the test composition is heated to 325° F. and air at the rate of about 10 liters per hour is passed through for a period of about 40 hours. Present in the test sample are specimens of iron, copper, aluminum, and lead. The loss in the weight of lead sample is measured, as are the increase in kinematic viscosity measured at 210° F. (percent KV change) and the change in the neutralization number (NN change). It should be noted that the metals are typical metals of engine or machine construction, and they also provide some catalysis for oxidation or organic materials. The compositions are also rated for oxidation stability, said numbers being based on the amount of phosphorus present in the sample required to limit the neutralization number increase to a maximum of 2.0. The results are tabulated in Table 1.

TABLE 1

| Additive of Example | Conc., wt. percent | NN change | Percent KV change | Lead loss, mg. | Stability |
|---|---|---|---|---|---|
| None | | 20.75 | 271 | 80 | |
| 2 | 1 | 7.10 | 48 | 0.5 | |
| | 0.5 | 4.70 | 47 | 12.9 | |
| 3 | 1 | 2.19 | 18 | 4.1 | |
| | ¹1 | 6.10 | 44 | 10 | |
| 4 | 1 | 1.55 | 11 | 0 | |
| 5 | ¹1 | 1.80 | 20 | 0.1 | |
| 6 | 1 | 0.38 | 9 | 7 | |
| | ¹1 | 1.6 | 37 | 43 | |
| 7 | 1 | 5.04 | 38 | 6.4 | |
| | 0.5 | 5.12 | gel | 5.0 | 40 |
| 8 | 1 | 0.03 | 6 | 1.0 | |
| | 0.5 | 0.29 | 8 | 0.7 | |

¹ With 30% by weight of a boron-containing non-metallic detergent.

The products of this invention were tested in the Bearing Corrosion Engine Test. In this test, a single cylinder CLR oil test engine (manufactured by Labeco) is operated for a period of 40 hours at a speed of 3150±10 r.p.m. and a temperature which may reach 290° F. The lubricant is a refined mineral oil containing an additive of this invention. At the end of the test, a copper-lead bearing is weighed to determine the loss of weight in mg. The result is evidence of the ability of an additive to protect the said bearing. The following results were obtained:

TABLE 2

| Product of Example | Conc., wt. percent | Bearing wt. loss, mg. |
|---|---|---|
| None | | 3,669 |
| 8¹ | 0.85 | 123 |

¹ Contains 3% by weight of the borated non-metallic detergent.

The results of the tests shown in the above tables indicate that the additives of this invention provide excellent antioxidant protection and reduce metal corrosion in engines.

The products of this invention may be used in lubricating oils, fuels and other industrial compositions, both liquid and solid. These compositions may contain other additives which provide additional characteristics of performance. From about 0.05% to about 10% by weight of the products may be present in the finished composition.

Having described the invention by means of specific illustrations and other embodiments, minor variations of which are still within the scope of the invention, I claim:

1. A product having the formula

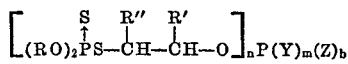

wherein R is an alkyl-substituted phenyl, in which the alkyl contains from 1 to 9 carbon atoms, R' and R" are selected from the group consisting of hydrogen, methyl and ethyl, Y is oxygen or sulfur, Z is selected from the group consisting of nonylphenoxy and alkoxy having from 4 to 8 carbon atoms, n is 1 to 3, M is zero or 1 and b is zero to 2, the sum of b and n being 3.

2. The product of claim 1 wherein R is tolyl, R' and R" are methyl, Z is octyloxy, n is 2, m is zero and b is 1.

3. The product of claim 1 wherein R is tolyl, R' and R" are methyl, Z is nonylphenoxy, n is 2, m is zero and b is 1.

4. The product of claim 1 wherein R is tolyl, R' and R" are methyl, Z is butoxy, n is 2, m is zero and b is 1.

5. The product of claim 1 wherein R is tolyl, R' and R" are methyl, Z is butoxy, n is 1, m is zero and b is 2.

6. The product of claim 1 wherein R is tolyl, R' and R" are methyl, Z is tertiary-butoxy, n is 1, m is zero and b is 2.

7. The product of claim 1 wherein R is tolyl, R' and R" are methyl, Z is octyloxy, n is 1, m is zero and b is 2.

8. The product of claim 1 wherein R is tolyl, R' and R" are methyl Z is butoxy, Y is sulfur, n is 2, m is 1 and b is 1.

References Cited

UNITED STATES PATENTS 3,259,579  7/1966  Rogers et al. _____ 260—928 V

FOREIGN PATENTS 1,185,858  1/1965  Germany _____ 260—928

LEWIS GOTTS, Primary Examiner

H. H. SUTTO, Assistant Examiner

U.S. Cl. X.R.

252—46.6; 260—953, 976

PO-1050 (5/69)

UNITED STATES PATENT OFFICE
CERTIFICATE OF CORRECTION

Patent No. 3,755,501      Dated August 28, 1973

Inventor(s) MILTON BRAID

It is certified that error appears in the above-identified patent and that said Letters Patent are hereby corrected as shown below:

Column 5, line 65, "30%" should be -- 3% --

Signed and sealed this 19th day of March 1974.

(SEAL)
Attest:

EDWARD M. FLETCHER, JR.
Attesting Officer

C. MARSHALL DANN
Commissioner of Patents